(12) United States Patent
Tsai et al.

(10) Patent No.: US 7,782,122 B2
(45) Date of Patent: Aug. 24, 2010

(54) ELECTRONIC DEVICE AND RELATED POWER CONTROL DEVICE FOR ENHANCING POWER STABILITY FOR POWER ON AND POWER OFF PROCESSES

(75) Inventors: Tung-Ling Tsai, Taipei Hsien (TW); Huang-Ping Lu, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 0 days.

(21) Appl. No.: 12/203,906

(22) Filed: Sep. 3, 2008

(65) Prior Publication Data

US 2009/0224814 A1   Sep. 10, 2009

(30) Foreign Application Priority Data

Mar. 4, 2008   (TW) .............................. 97203655 U (51) Int. Cl.
G05F 3/02   (2006.01)

(52) U.S. Cl. ...................................... 327/538; 323/901

(58) Field of Classification Search ................. 327/306, 327/318, 538, 540, 542; 323/901, 908; 363/49, 363/50
See application file for complete search history.

(56) References Cited

U.S. PATENT DOCUMENTS

| 5,930,130 A * | 7/1999 | Katyl et al. .................... 363/53 |
| 7,180,757 B2 * | 2/2007 | Chen et al. ..................... 363/49 |
| 7,274,179 B2 * | 9/2007 | Matsuda ...................... 323/282 |
| 7,379,311 B2 * | 5/2008 | Shih ............................ 363/52 |

* cited by examiner

Primary Examiner—Lincoln Donovan
Assistant Examiner—Patrick O'Neill
(74) Attorney, Agent, or Firm—Winston Hsu (57) ABSTRACT

A power control device for an electronic device for enhancing power stability when the electronic device is powered on including a high-pass filtering unit for performing a filtering process on an input signal for generating an output signal, and a control unit coupled to the high-pass filtering unit and a first voltage generator of the electronic device for outputting the output signal to the first voltage generator according to the voltage level of the output signal.

10 Claims, 6 Drawing Sheets

ELECTRONIC DEVICE AND RELATED POWER CONTROL DEVICE FOR ENHANCING POWER STABILITY FOR POWER ON AND POWER OFF PROCESSES

BACKGROUND OF THE INVENTION

1. Field of the Invention

The present invention relates to a power control device for an electronic device, and more particularly, to a power control device for enhancing power stability when the electronic device is powered on and powered off.

2. Description of the Prior Art

An inrush current is a maximum, instantaneous input current drawn by an electronic device when first turned on and is far beyond the electrical specification of the electronic device, therefore, the inrush current easily results in the damage in the electronic device. For the electronic device using an external adapter as a power supply, such as a computer or a printer, there is usually a built-in inrush current restraint circuit in the electronic device for preventing damage. However, the prior art inrush current restraint circuit is implemented by a dedicated protection IC and many passive components, hence high production cost and area cost are required.

In addition, a regulated capacitor with large capacitance is located at the power supply terminal of the electronic device for power stability. When the electronic device is powered off, there is a residual voltage left on the regulated capacitor so that the voltage level of the power supply of the electronic device hardly returns to the initial level after being powered off. In this situation, if the electronic device is powered on again when the discharging process of residual voltage is not finished yet, abnormal operation may happen so that the electronic device cannot be turned on. The prior art device for discharging residual voltage is complicated and production cost cannot be saved.

SUMMARY OF THE INVENTION

It is therefore a primary objective of the claimed invention to provide a power control device for an electronic device for enhancing power stability when the electronic device is powered on and powered off.

The present invention discloses a power control device for an electronic device for enhancing power stability when the electronic device is powered on including a high-pass filtering unit for performing a filtering process on an input signal for generating an output signal, and a control unit coupled to the high-pass filtering unit and a first voltage generator of the electronic device for outputting the output signal to the first voltage generator according to the voltage level of the output signal.

The present invention further discloses a power control device for an electronic device for enhancing power stability when the electronic device is powered off including a first transistor, a first current limiting unit and a second transistor. The first transistor includes a first terminal coupled to a first voltage generator, a second terminal and a third terminal coupled to a ground terminal for controlling a signal connection between the first terminal of the first transistor and the third terminal of the first transistor according to the voltage level of the second terminal of the first transistor. The first current limiting unit is coupled between the first voltage generator and the second terminal of the first transistor for controlling a conducting current from the first terminal of the first transistor to the third terminal of the first transistor. The second transistor includes a first terminal coupled to the second terminal of the first transistor, a second terminal and a third terminal coupled to the ground terminal for controlling a signal connection between the first terminal of the second transistor and the third terminal of the second transistor according to the voltage level of the second terminal of the second transistor so as to control the signal connection between the first terminal of the first transistor and the third terminal of the first transistor.

The present invention further discloses an electronic device for enhancing power stability when powered on and powered off including a voltage generator for generating an input signal, a processing unit for generating a power source according to an output signal, a first power control device coupled between the voltage generator and the processing unit for performing a filtering process on the input signal when the electronic device is powered on for outputting the output signal to the processing unit, and a second power control device coupled to the processing unit for performing active discharging on a regulated capacitor of the processing unit when the electronic device is powered off.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
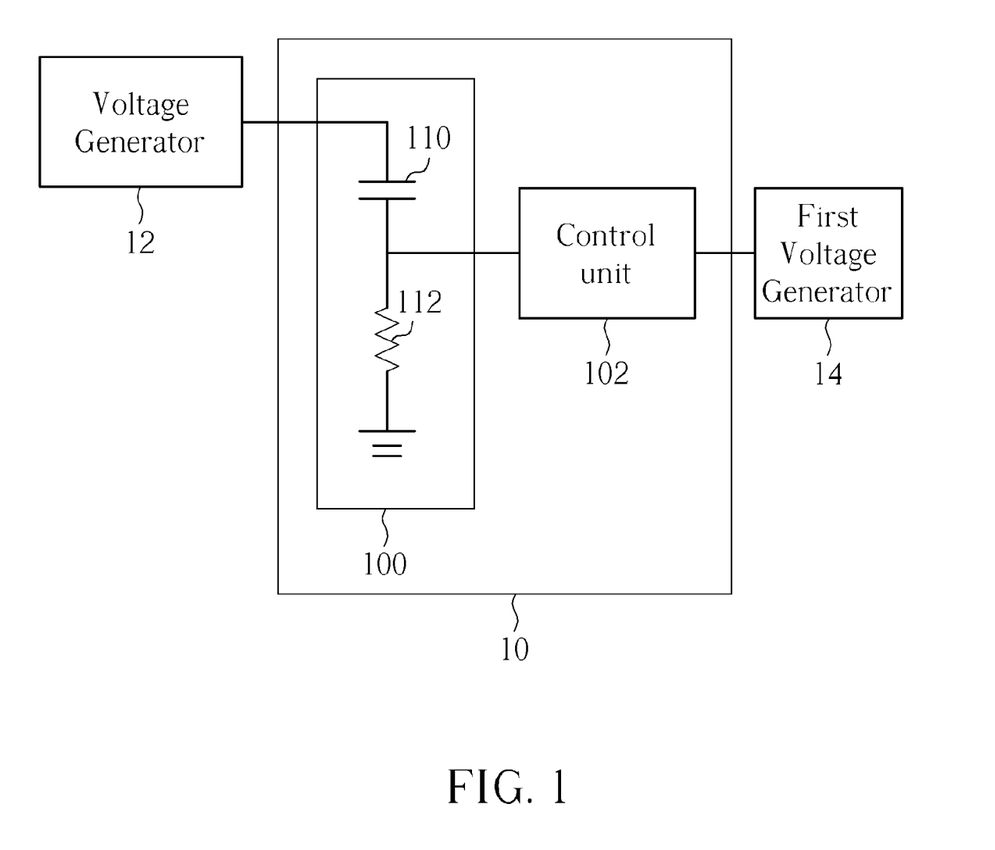
FIG. 1 is a schematic diagram of a power control device according to an embodiment of the present invention.

Please refer to FIG. 1, which illustrates a schematic diagram of a power control device 10 according an embodiment of the present invention. The power control device 10 is utilized for an electronic device for enhancing power stability when the electronic device is powered on, and comprises a high-pass filtering unit 100 and a control unit 102. The high-pass filtering unit 100 comprises a capacitor 110 and a resistor 112. The capacitor 110 is coupled between a voltage generator 12 and the control unit 102; the resistor 112 comprises one terminal coupled to the control unit 102 and the capacitor 110 and the other terminal coupled to a ground terminal. The high-pass filtering unit 100 is a differential circuit, which is utilized for performing a filtering process on an input signal according an appropriate RC time constant generated by the capacitor 110 and the resistor 112, for minimizing an inrush current component in the input signal and generating an output signal.

In addition, the control unit 102 is coupled to the high-pass filtering unit 100 and a first voltage generator 14 and is utilized for outputting the output signal to the first voltage generator 14 according to the voltage level of the output signal. In detail, when the voltage level of the output signal is greater than a threshold voltage, the control unit 102 outputs the output signal to the first voltage generator 14; oppositely, when the voltage level of the output signal is smaller than the threshold voltage, the control unit 102 stops outputting the output signal to the first voltage generator 14. That is, the control unit 102 is operated as a switch for controlling a connection between the high-pass filtering unit 100 and the first voltage generator 14. For example, the control unit 102 is a p-MOSFET.

In a word, the power control device 10 is coupled between the voltage generator 12 and the first voltage generator 14 and is utilized for minimizing the inrush current component in the input signal generated by the voltage generator 12, for outputting the stable output signal to the first voltage generator 14. Therefore, if the power control device 10 is used in an electronic device, such as a computer or a printer, the power control device 10 can prevent the electronic device from being damaged by the inrush current.

Figure 2:
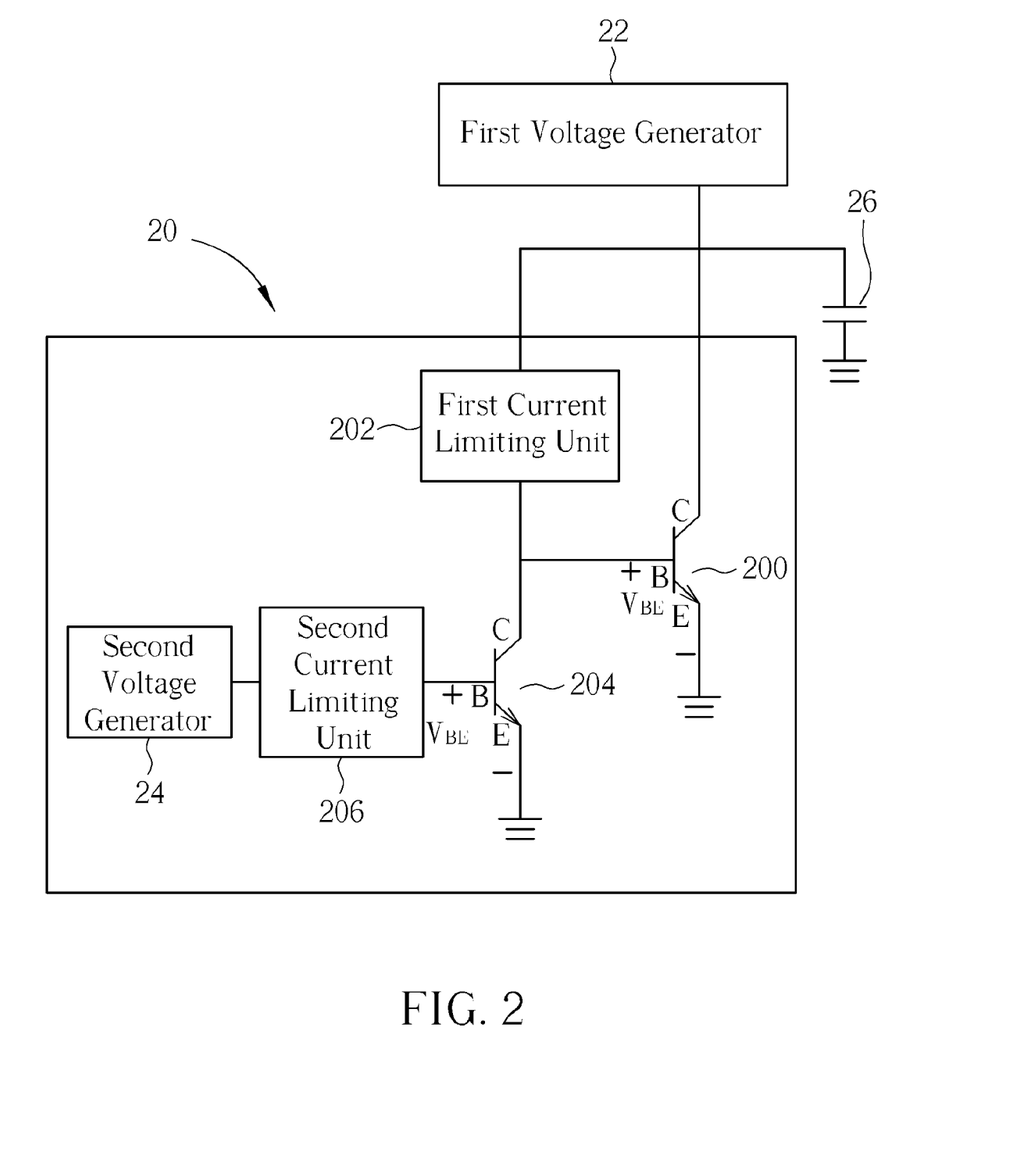
FIG. 2 is a schematic diagram of a power control device according to an embodiment of the present invention.

On the other hand, please refer to FIG. 2, which illustrates a schematic diagram of a power control device 20 according to an embodiment of the present invention. The power control device 20 is utilized for rapidly discharging a residual voltage after the power control device 20 is powered off for enhancing power stability. The power control device 20 comprises a first transistor 200, a first current limiting unit 202, a second transistor 204, a second current limiting unit 206 and a second voltage generator 24. In FIG. 2, the first transistor 200 and the second transistor 204 are preferably NPN bipolar junction transistors (BJT). The first transistor 200 comprises a collector coupled to a first voltage generator 22, a base coupled to the first current limiting unit 202 and a collector of the second transistor 204, and an emitter coupled to a ground terminal of a voltage level 0V. The second transistor 204 comprises a collector coupled to the base of the first transistor 200 and the first current limiting unit 202, a base coupled to the second current limiting unit 206, and an emitter coupled to the ground terminal. The first current limiting unit 202 is coupled to the first voltage generator 22, the base of the first transistor 200 and the collector of the second transistor 204 and is utilized for controlling a conducting current from the collector of the first transistor 200 to the emitter of the first transistor 200. The second current limiting unit 206 is coupled between the second voltage generator 24 and the second transistor 204. The second voltage generator 24 is utilized for controlling the voltage level of the base of the second transistor 204; the second current limiting unit 206 is utilized for controlling a current from the second voltage generator 24 to the base of the second transistor 204. In detail, the second voltage generator 24 and the second current limiting unit 206 are utilized for controlling a signal connection between the collector of the second transistor 204 and the emitter of the second transistor 204, so as to control a signal connection between the collector of the first transistor 200 and the emitter of the first transistor 200.

Note that, the first voltage generator 22 is installed in the electronic device and is coupled to a regulated capacitor 26 with large capacitance. The power control device 20 is utilized for performing an active discharging process on the regulated capacitor 26 for rapidly discharging a residual voltage left on the regulated capacitor 26 after the electronic device is powered off. When the electronic device is powered on, the second voltage generator 24 is also powered on, and the voltage difference $V_{BE}$ between the base and the emitter of the second transistor 204 reaches a cut-in voltage, so that the second transistor 204 is turned on, which forces the first transistor 200 to be turned off. Next, when the electronic device is powered off, the second voltage generator 24 is also powered off and the output voltage of the second voltage generator 24 is back to 0V. At the same time, the base of the second transistor 204 is 0V and the voltage differnece $V_{BE}$ of the second transistor 204 falls to be 0V, so that the second transistor 204 is turned off first, which forces the first transistor 200 to be turned on. Note that, when the electronic device is powered off, the residual voltage left on the regulated capacitor 26 is hardly cleared. In the embodiment of the present invention, when the first transistor 200 is turned on, the power control device 20 can control the conducting current of the first transistor 200 according to the first current limiting unit 202 so as to perform the active discharging process on the regulated capacitor 26. Therefore, the voltage level of the output signal of the first voltage generator 22 returns to normal initial state, 0V. Therefore, the power control device 20 can prevent the electronic device from abnormal operation when the electronic device is powered on again which is caused by the residual voltage left on the regulated capacitor 26.

In a word, the power control device 20 rapidly discharges the residual voltage left on the regulated capacitor 26 according to the ON/OFF state of the first transistor 200 and the second transistor 204. Therefore, the electronic device can be powered on again normally. Note that, the power control device 20 is an embodiment of the present invention, and the second transistor 204 can be not only a BJT component but also a metal-oxide-semiconductor field effect transistor (MOSFET) component, such as a p-MOSFET. In addition, the first transistor 200 is utilized for large current control, so that the component should be chosen carefully. Moreover, the ON/OFF state of the second transistor 204 is controlled by the voltage $V_B$ of the base of the second transistor 204. In other words, the voltage $V_B$ of the base of the second transistor 204 can also be controlled by a voltage dividing device and a current limiting device, such as a voltage dividing resistor coupled to the first voltage generator 22 so that the ON/OFF state of the second transistor 204 can be controlled by the first voltage generator 22. In addition, whether the second current limit unit 206 is used depends on demands.

Figure 3:
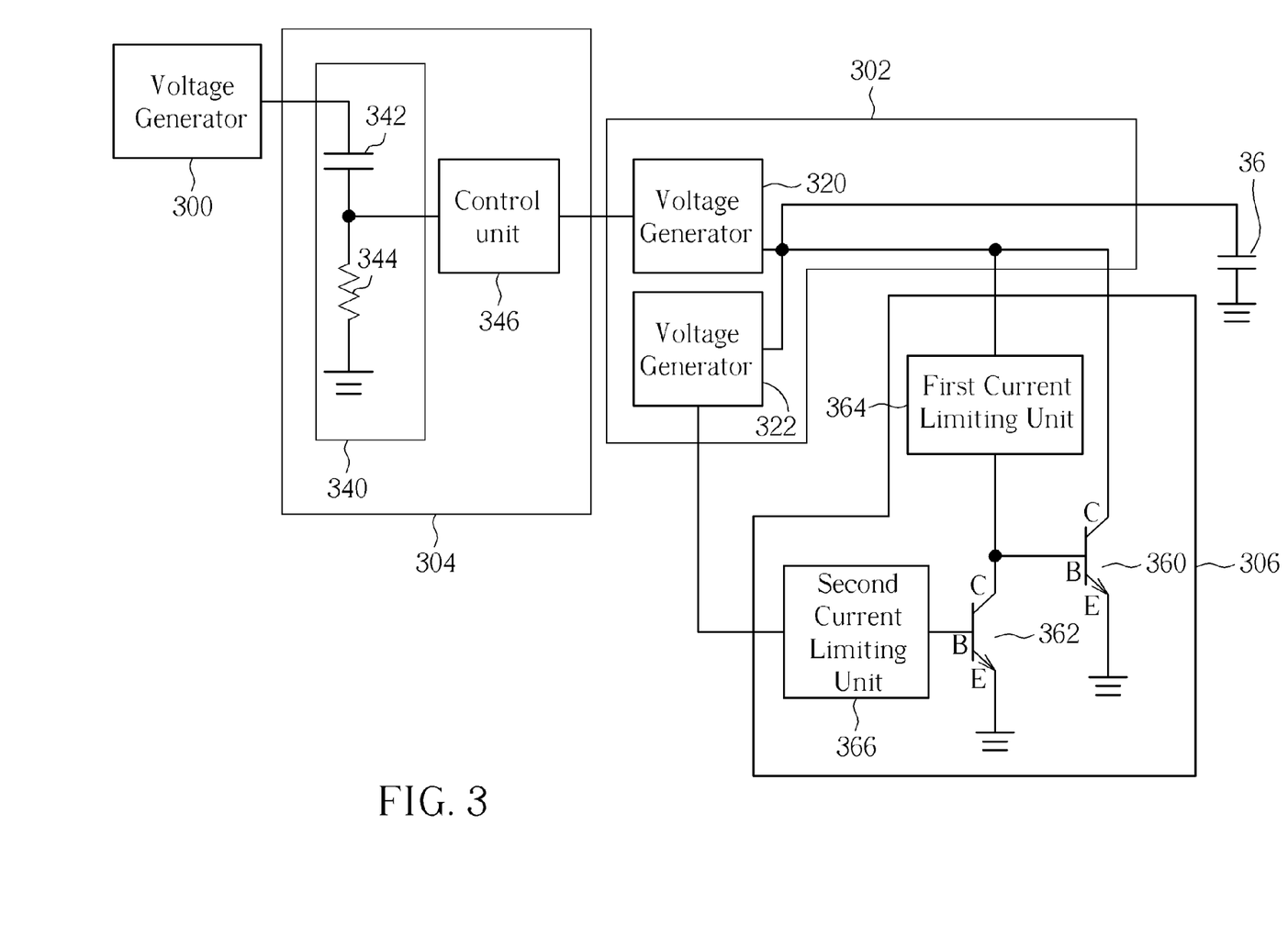
FIG. 3 is a schematic diagram of an electronic device according to an embodiment of the present invention.

Please refer to FIG. 3, which illustrates a schematic diagram of an electronic device 30 according to an embodiment of the present invention. The electronic device 30 can be a device as a Multi-Function Printer (MFP). The electronic device 30 comprises a voltage generator 300, a processing unit 302, a first power control device 304 and a second power control device 306. The voltage generator 300 is utilized for generating an input signal, outputted to the first power control device 304. The first power control device 304 comprises a high-pass filtering unit 340 coupled to the voltage generator 300 and a control unit 346 coupled to the processing unit 302. The high-pass filtering unit 340 comprises a capacitor 342 and a resistor 344. The first power control device 304 is similar to the power control device 10 in FIG. 1, for performing a filtering process on the input signal outputted from the voltage generator 300 when the electronic device 30 is powered on, for minimizing the inrush current component in the input signal and outputting the stable output signal to the processing unit 302. The processing unit 302 is utilized for handling the central processing of the electronic device 30, and can be an integrated circuitry of a central processing unit combined with a power management unit, for example. In order to clearly illustrate the relationships among processing unit 302, the first power control device 304, and the second power control device 306, only a voltage generator 320 and a voltage generator 322 are shown in the processing unit 302.

The voltage generator 320 is similar to the first voltage generator 14 in FIG. 1 and the first voltage generator 22 in FIG. 2, utilized for receiving the stable output signal from the processing unit 302 and generating a voltage outputted to the power control device 306. The output terminal of the voltage generator 320 is coupled to a regulated capacitor 36. The voltage generator 322 can be used as the second voltage generator 24; that is to say, the utility of the voltage generator 322 is similar to the utility of the second voltage generator 24 that is generating a voltage outputted to the second power control device 306. The second power control device 306 comprises a first transistor 360, a second transistor 362, a first current limiting unit 364, and a second current limiting unit 366. The base of the first transistor 360 and the first current limiting unit 364 are coupled to the output terminal of the voltage generator 320; the second current limiting unit 366 is coupled to the voltage generator 322. The second power control device 306 is similar to the power control device 20, and is utilized for performing an active discharging process on the regulated capacitor 36 when the electronic device 30 is powered off. From the above, when the power control device 10 and the power control 20 are both applied in an electronic device, the first voltage generator 14 in FIG. 1 is equal to the first voltage generator 22 in FIG. 2, and is located in the processing unit 302. The first power control device 304 is coupled to the second power control device 306 via the processing unit 302.

From the above, the first power control device 304 and the second power control device 306 can prevent the electronic device 30 from being damaged by the inrush current when powered on so that the electronic device 30 can operate normally, and can perform the active discharging process on the regulated capacitor 36 for discharging the residual voltage on the regulated capacitor 36 when powered off.

Figure 4:
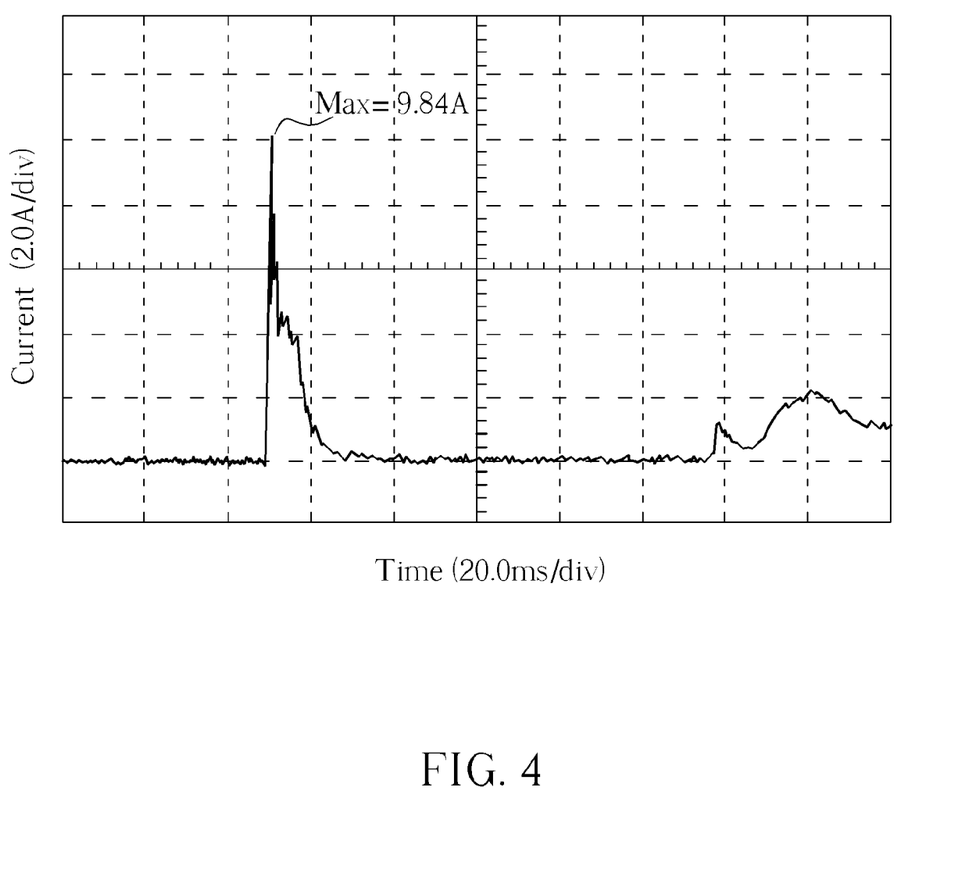
FIG. 4 is a current waveform of the output of the voltage generator of the electronic device in FIG. 3 when powered on and an inrush current restraint device is not included.
Figure 5:
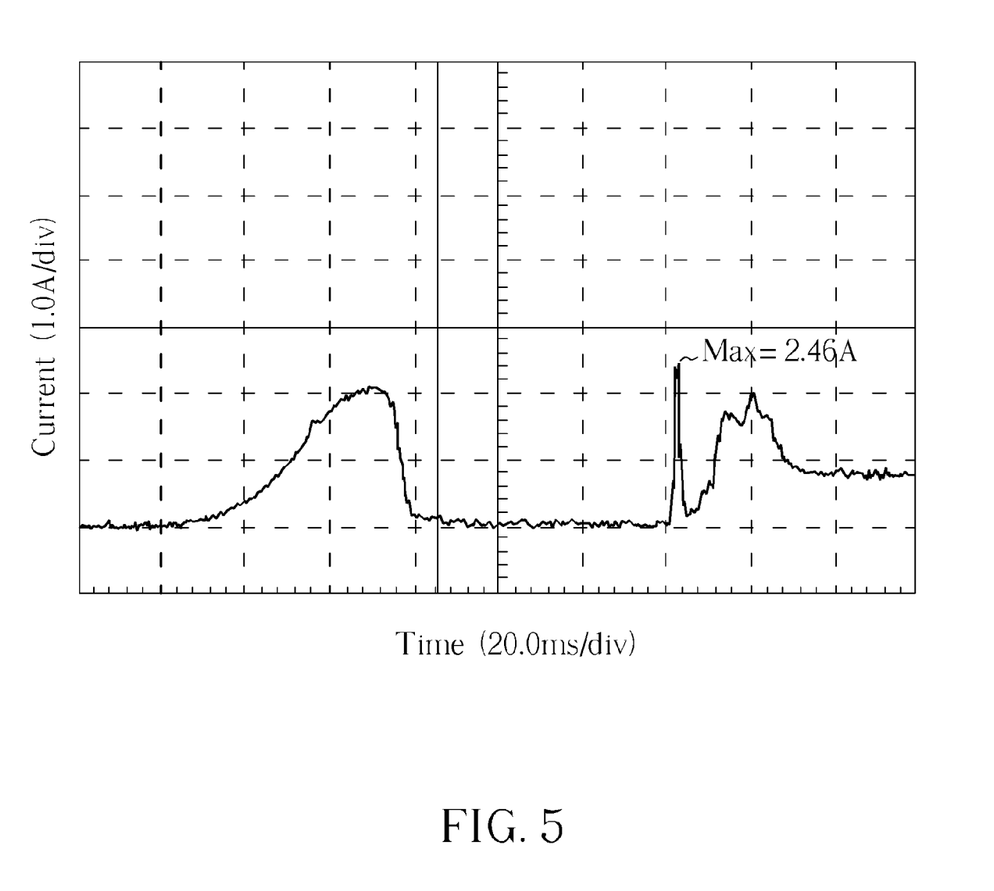
FIG. 5 is a current waveform of the output of the voltage generator of the electronic device in FIG. 3 when powered on and an inrush current restraint device is included.

On the other hand, please refer to FIG. 4 and FIG. 5. FIG. 4 is a current waveform of the output of the voltage generator 300 when the first power control device 304 is not included in the electronic device 30; FIG. 5 is a current waveform of the output of the first power control device 304 when the first power control device 304 is included in the electronic device 30. As shown in FIG. 4, the maximum of the inrush current reaches 9.84 A that is beyond the maximum 4 A in the allowable current specification of a general multi-function printer. Compared with the FIG. 4, as shown in FIG. 5, the first power control device 304 effectively minimizes the inrush current to 2.46 A that is safe in the allowable current specification of the general multi-function printer, thereby, the first power control device 304 prevents the multi-function printer from being damaged by the inrush current.

Figure 6:
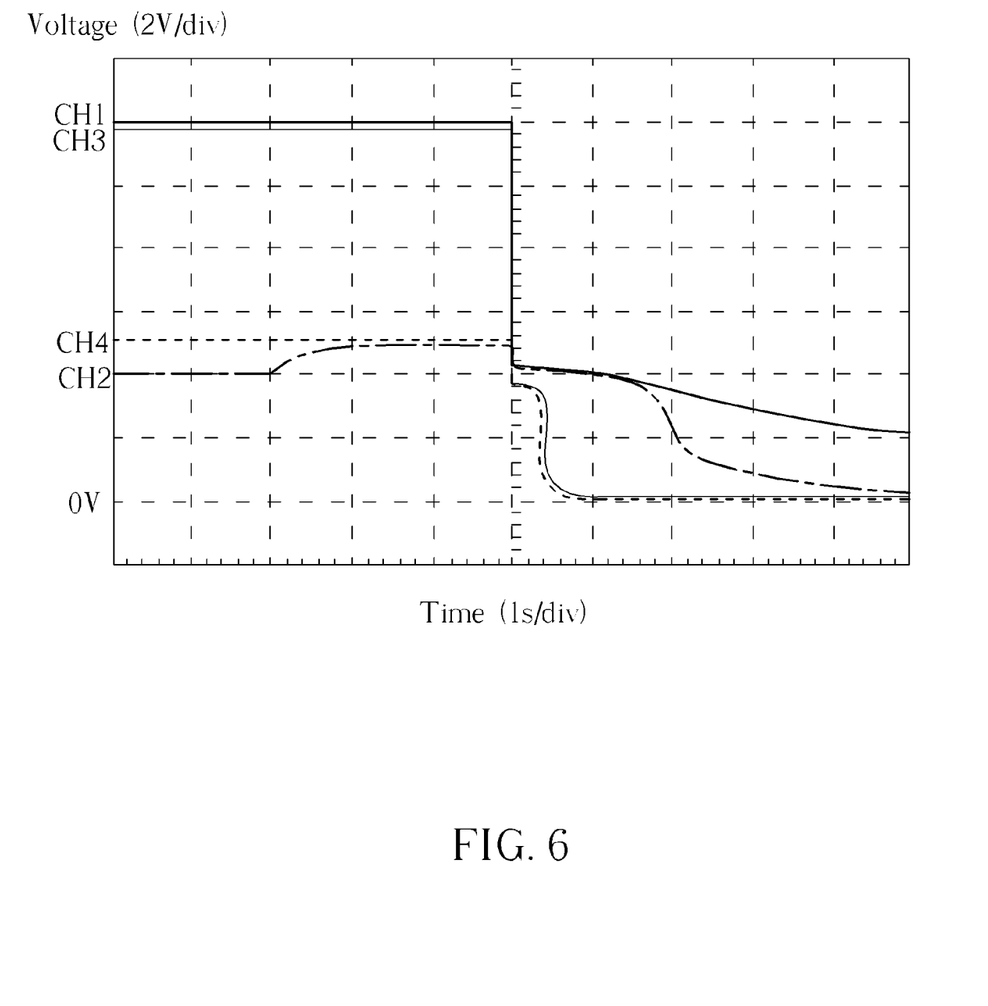
FIG. 6 is a voltage waveform of power sources of the electronic device in FIG. 3 when powered off before and after an active discharging device is included.

Please refer to FIG. 6. FIG. 6 is a voltage waveform of discharging in the electronic device 30. In FIG. 6, CH1 and CH2 respectively represent the output of the voltage generator 300 and an output of a 5V voltage generator as the voltage generator 322 in the electronic device 30 when the electronic device 30 is powered off and the second power control device 306 is not included. In FIG. 6, the voltage generator 300 outputs 12V, and the 5V voltage generator is in the processing unit 302. The 5V voltage generator can be used as the second voltage generator 24 in FIG. 2. On the other hand, CH3 and CH4 respectively represent the output of the first power control device 304 and the output of the 5V voltage generator when the electronic device 30 is powered off and the first power control device 304 and the second power control device 306 are both included. As shown in CH1 and CH2, if the second power control device 306 is not included in the electronic device 30, the output voltage of the voltage generator 300 takes more than 10 seconds to discharge to return to 0V; the output voltage of the 5V voltage generator takes more than 2 seconds to discharge to return to 0V. As shown in CH3 and CH4, the output voltage of the voltage generator 300 or the 5V voltage generator takes less than 1 second to discharge to return to 0V. Therefore, the second power control device 306 can help discharge the residual voltage on the power source of the electronic device 30.

In conclusion, the present invention performs the filtering process on the input signal of the electronic device via the high-pass filtering unit for generating a safe output signal, so as to prevent the electronic device from being damaged by the inrush current when the electronic device is powered on. On the other hand, the present invention can discharge the residual voltage on the regulated capacitor after the electronic device is powered off according to the ON/OFF state of the first transistor 200 and the second transistor 204. As a result, the electronic device is powered on again normally.

Those skilled in the art will readily observe that numerous modifications and alterations of the device and method may be made while retaining the teachings of the invention.

What is claimed is:

1. An electronic device for enhancing power stability when powered on and powered off comprising:
    a voltage generator for generating an input signal;
    a processing unit for generating an input power according to an output signal;
    a first power control device coupled between the voltage generator and the processing unit for performing a filtering process on the input signal when the electronic device is powered on for outputting the output signal to the processing unit; and
    a second power control device coupled to the processing unit for performing active discharging on a regulated capacitor coupled to the processing unit when the electronic device is powered off.

2. The electronic device of claim 1, wherein the first power control device comprises:
    a high-pass filtering unit for performing the filtering process for the input signal for generating the output signal; and
    a control unit coupled to the high-pass filtering unit and a first voltage generator of the processing unit for outputting the output signal to the first voltage generator according to voltage level of the output signal.

3. The electronic device of claim 2, wherein the high-pass filtering unit comprises:
    a capacitor coupled between the voltage generator and the control unit; and
    a resistor comprising one terminal coupled to the control unit and the capacitor and the other terminal coupled to a ground terminal.

4. The electronic device of claim 3, wherein the control unit is utilized for outputting the output signal to the processing unit when the voltage level of the output signal is greater than a threshold voltage.

5. The electronic device of claim 3, wherein the control unit is utilized for stopping outputting the output signal to the processing unit when the voltage level of the output signal is smaller than a threshold voltage.

6. The electronic device of claim 1, wherein the second power control device comprises:
    a first transistor comprising a first terminal coupled to the processing unit, a second terminal and a third terminal coupled to a ground terminal for controlling a signal connection between the first terminal of the first transistor and the third terminal of the first transistor according to the voltage level of the second terminal of the first transistor;

a first current limiting unit coupled between the processing unit and the second terminal of the first transistor, for controlling a conducting current from the first terminal of the first transistor to the third terminal of the first transistor; and a second transistor comprising a first terminal coupled to the second terminal of the first transistor, a second terminal and a third terminal coupled to the ground terminal for controlling a signal connection between the first terminal of the second transistor and the third terminal of the second transistor according to the voltage level of the second terminal of the second transistor so as to control the signal connection between the first terminal of the first transistor and the third terminal of the first transistor.

7. The electronic device of claim 6, wherein the second transistor is utilized for conducting the signal connection between the first terminal of the second transistor and the third terminal of the second transistor when the voltage level of the second terminal of the second transistor is greater than a cut-in voltage.

8. The electronic device of claim 7, wherein the second transistor is utilized for cutting off the signal connection between the first terminal of the first transistor and the third terminal of the first transistor when the signal connection between the first terminal of the second transistor and the third terminal of the second transistor is conducted.

9. The electronic device of claim 8, wherein the second transistor is utilized for cutting off the signal connection between the first terminal of the second transistor and the third terminal of the second transistor when the voltage level of the second terminal of the second transistor is smaller than the cut-in voltage.

10. The electronic device of claim 9, wherein the second transistor is utilized for conducting the signal connection between the first terminal of the first transistor and the third terminal of the first transistor when the signal connection between the first terminal of the second transistor and the third terminal of the second transistor is cut off.

* * * * *